N. W. McLEOD.
RESILIENT TIRE.
APPLICATION FILED SEPT. 13, 1916.
1,249,649.
Patented Dec. 11, 1917.
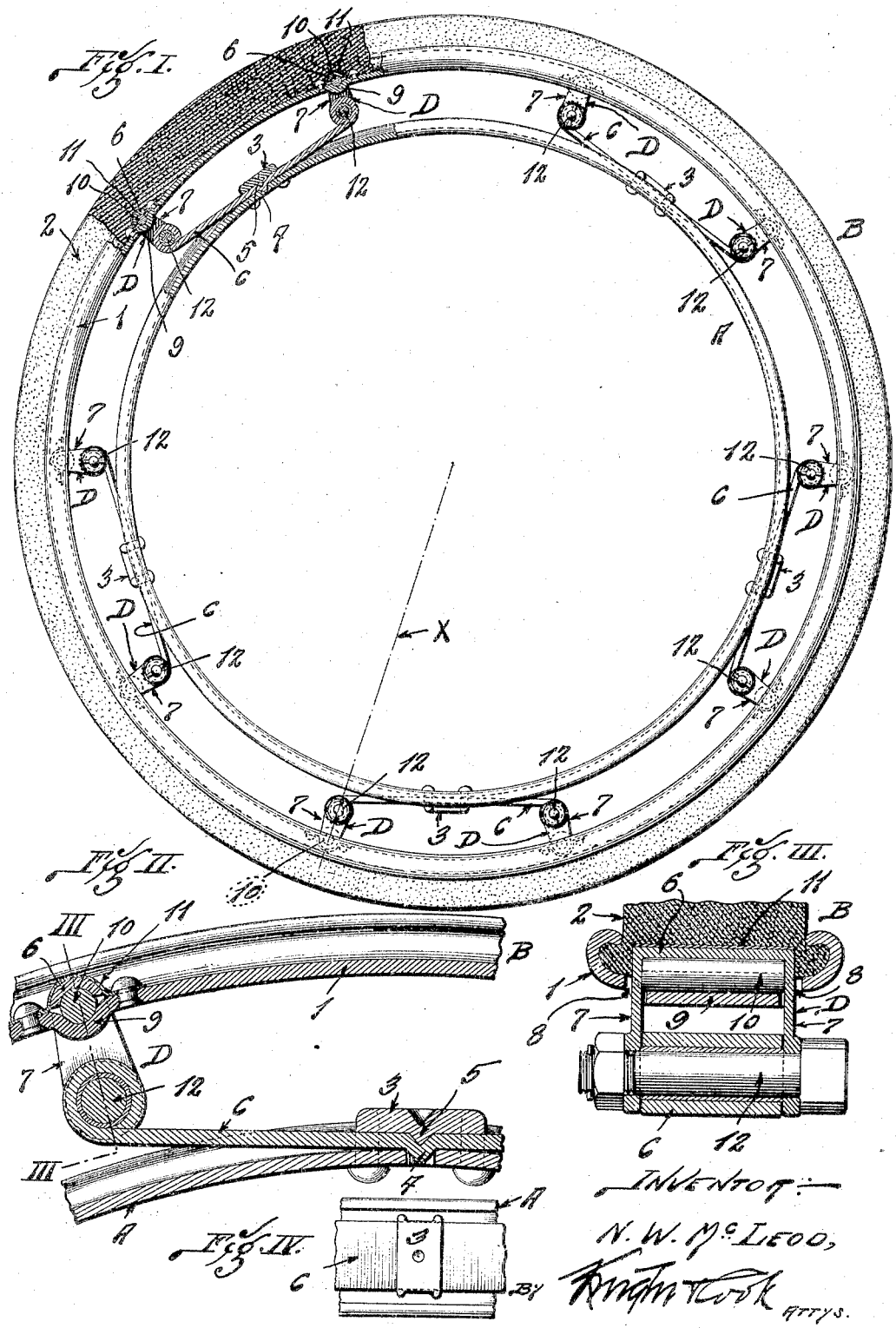

UNITED STATES PATENT OFFICE.

NELSON W. McLEOD, OF ST. LOUIS, MISSOURI.

RESILIENT TIRE.

1,249,649.
Specification of Letters Patent.
Patented Dec. 11, 1917.

Application filed September 13, 1916. Serial No. 119,809.

*To all whom it may concern:*

Be it known that I, NELSON W. McLEOD, a citizen of the United States of America, a resident of the city of St. Louis, State of Missouri, have invented certain new and useful Improvements in Resilient Tires, of which the following is a full, clear, and exact description, reference being had to the accompanying drawing, forming a part of this specification.

My invention relates to a resilient tire comprising shock-absorbing metallic springs one of the objects being to produce an efficient and reliable resilient tire having its elements so constructed and arranged that the springs will not be subjected to such twisting or torsional strains as tend to crystallize the metal of which they are composed.

A further object of the invention is to produce a strong and simple resilient tire of this kind consisting of a minimum number of inexpensive elements which coöperate with each other to successfully perform all of the essential functions of a resilient tire.

Figure I is a side elevation, partly in longitudinal section, illustrating a resilient tire constructed in accordance with my invention.

Fig. II is an enlarged fragmentary longitudinal section showing one of the spring connections between the inner and outer rims.

Fig. III is a cross section taken approximately on the line III—III, Fig. II.

Fig. IV is a view of a portion of the inner rim.

To illustrate the invention I have shown an inner rim A, of the demountable type, adapted to interchange with the standard demountable rims on which pneumatic tires are commonly used; an outer rim B comprising a tire receiving ring 1 and a rubber or other tire 2 fitted to said ring; and leaf springs C secured to one of said rims and shackle links D connecting said leaf springs to the other rim. Each leaf spring is preferably secured at its longitudinal center to the inner rim A by a clip 3 interlocked with the spring C, as shown most clearly in Fig. II. The interlocking elements include a projection 4 at the center of the leaf spring extending into an opening in the inner rim A. A projection 5, extending from the clip 3 seats in the leaf spring. Each leaf spring C is thus securely fastened to the inner rim.

Each shackle link D is a substantially U-shaped device (Figs. II and III) consisting of a socket member 6 and a pair of tension arms 7 extending from the ends of said socket member. In assembling the shackle links, their tension arms 7 are inserted through openings 8 (Fig. III) in the tire receiving ring 1. Portions of the tire receiving ring 1 are depressed to form sockets 9 (Figs. II and III) at points between the openings 8. 10 designates antifriction pivot rods interposed between and fitted to the socket members 6 and 9. Cover plates 11 are secured over the socket members 6 to prevent the latter from engaging the rubber tire. The tire may be molded and vulcanized on the tire receiving ring 1 after the shackle links have been assembled.

In assembling my tire the arms of the leaf springs C are forced toward the outer rim tire section and then secured to the shackle links by means of pivot bolts 12. Consequently the springs tend to move inwardly toward the axis of the tire and they tend to pull the shackle links D toward such axis.

To obtain a clear understanding of the action of the springs and links it is important to note:—First, that each shackle link is a double hinge device having the two pivots 10 and 12 and it is adapted to oscillate about the axis of either of these pivots: second, each pivot 10 is in radial alinement with the adjacent pivot 12 as indicated by the radial line X, Fig. I: third, the tension arms 7 of the shackle links are constantly held under tension by the springs C, and the pulling action of these springs tends to retain the pivots 12 in radial alinement with the respective pivots 10.

When the inner rim A turns in either direction independently of the outer rim B, or when the outer rim B turns in either direction independently of the inner rim A, all of the shackle links turn on the axes of pivots 10, and the pivots 12 move in an arcuate path toward the outer rim. The ends of the springs C are thus shifted toward the outer rim so as to gradually increase the tension of the links 7. The springs C tend to return to their normal condition, thereby tending to return the links 7 to the radial positions shown in Figs. I and II. Obviously, the links 7 will move from their radial positions against the resistance offered by the pulling action of the springs, thereafter returning to their normal positions in response to the action of said springs.

When one of the annular rims A or B is forced upwardly or downwardly relative to the other section, all of the oscillatory shackle links D will turn from their radial positions and the shocks will be cushioned by the springs C. Thereafter, the shackle links will return to their radial positions in response to the pulling action of the springs C.

It will now be understood that the few simple elements of the new tire very effectively perform all of their functions without subjecting the springs to twisting or torsional strains which have heretofore crystallized the springs of such tires. The leaf springs merely bend toward and away from the tire section in a manner similar to the bending movements of the body supporting leaf springs of a vehicle, or the leaf truck springs of a railway car, and such springs C are well adapted to withstand movements of this kind for a very long period of time.

I claim:—

1. A resilient tire comprising inner and outer rims concentric with each other, leaf springs rigidly secured to one of said rims, and means for pivotally connecting said springs to the other rim, all of said leaf springs being normally under tension in a direction tending to move said outer rim toward the axis of the tire.

2. A resilient tire comprising inner and outer rims, leaf springs secured to one of said rims, and oscillatory tension members connecting the ends of said leaf springs to the other rim, all of said leaf springs being normally under tension in a direction tending to move said rims toward each other, and the oscillatory tension members being so arranged that the tension members will oscillate in response to shocks transmitted through said leaf springs.

NELSON W. McLEOD.

Copies of this patent may be obtained for five cents each, by addressing the "Commissioner of Patents, Washington, D. C."